Feb. 8, 1927.
M. E. WEDGE
1,616,644
DETACHABLE STRAINER
Filed Sept. 19, 1924
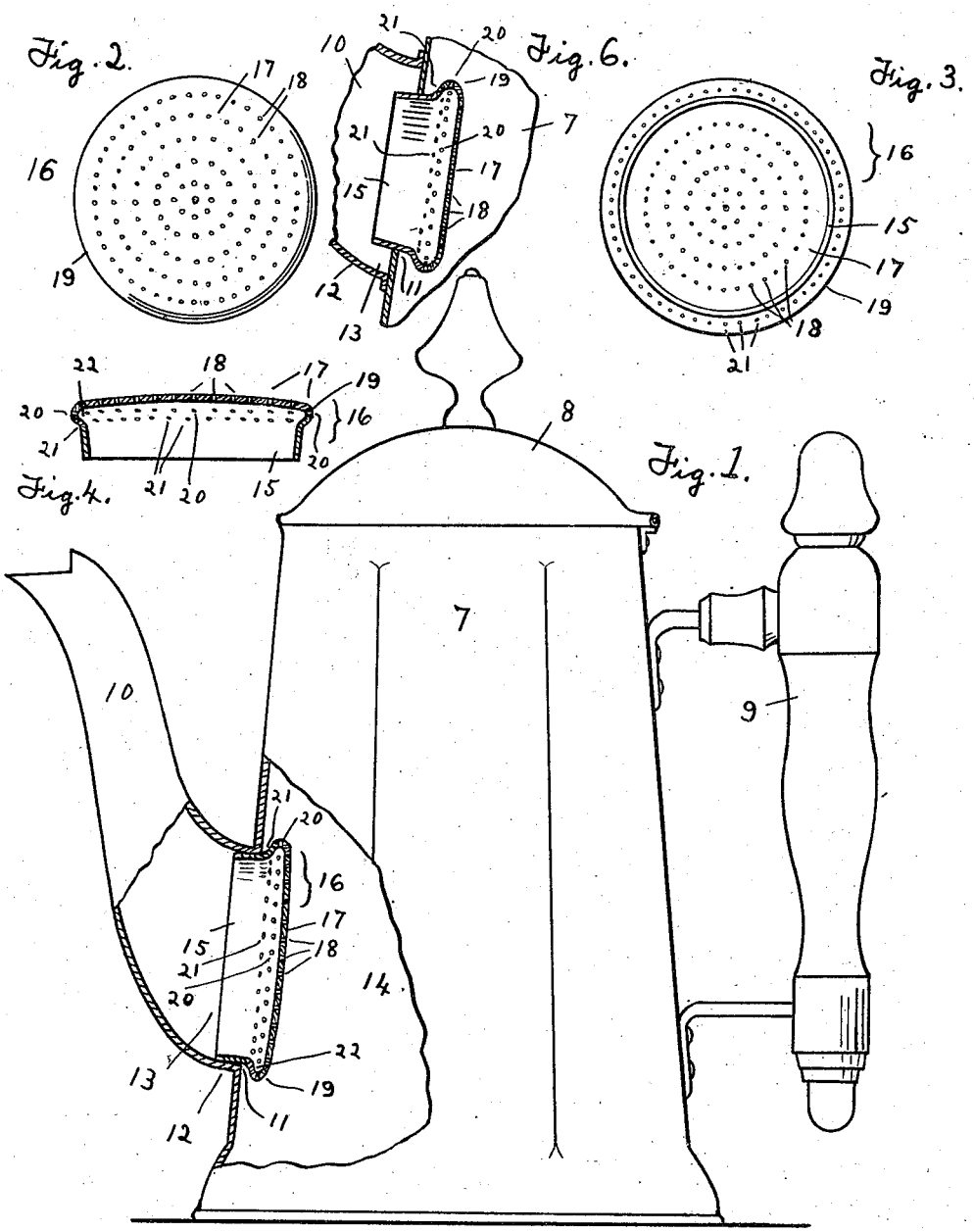
Inventor
Mary E. Wedge
By Martin & Rendell
Attorneys Patented Feb. 8, 1927.

1,616,644

UNITED STATES PATENT OFFICE.

MARY E. WEDGE, OF HAMILTON, NEW YORK.

DETACHABLE STRAINER.

Application filed September 19, 1924. Serial No. 738,664.

My present invention relates to a detachable strainer particularly applicable for use with a coffee pot or tea pot but generally applicable to other receptacles having a spout and requiring a strainer between the spout and the receptacle.

The purpose of my invention is to provide a removable strainer of the type suggested which is of new and improved form and which is simple and economical in construction, readily applied or detached and which is effective and durable in use and capable of being very readily cleaned.

A further purpose is to provide an article of the class described of such form that it may be readily and satisfactorily constructed from any of the metals commonly used for such receptacles by stamping or other machine processes without the use of joints or other operations requiring hand work and further to have the strainer of such form and co-operation with the receptacle that the strainer may be made of any of the commonly used metals or of china, glass or earthen ware.

A still further object is to provide a strainer of such form and so attached to the spouted receptacle that no additional parts and no projecting or locking hooked members have to be provided upon either the receptacle or the spout resulting in economy of manufacture and cleanliness in use; and further to have the strainer of such construction that the opening from the receptacle into the adjacent end of the spout may be and preferably will be as large as the adjacent opening of the spout resulting in the receptacle pouring very freely and in the strainer and spout having a relatively large capacity and being unusually free from obstruction by tea leaves or coffee grounds. The feature of having the hole from the receptacle as large as the adjacent opening in the spout also eliminates any ledge or crevice within the spout which ledge has heretofore been common and has formed a place which was hard to keep clean because not readily reached by the hand or dish cloth. My strainer being readily and quickly removable and being especially adapted to allow of a full sized opening from the receptacle into the spout admits of the housewife easily removing the tea leaves or coffee grounds from the pot by removing the strainer and flooding the tea leaves or coffee grounds out through the spout rather than through the main top opening of the receptacle. On the other hand, my strainer is not limited to use with receptacles having an opening therefrom as large as the adjacent openings in the spout and smaller sizes of my strainer may be utilized on coffee pots or tea pots having such a small hole and not theretofore provided with any strainer or at least not provided with my type of strainer.

A still further object is to provide a strainer of the type described which is removably placed in the receptacle end of the spout and held therein by frictional contact and wedging action so that when as in the ordinary case the strainer is circular in form it will fit and hold in the opening in any position, that is without having to make co-operating locking members meet; and so that any slight wearing away of the contacting parts of the strainer or of the receptacle incident to use will not interfere with the ready attachment or removal of the strainer since such wearing of the parts will be overcome simply by pushing the strainer further into the spout.

Further purposes and advantages of the invention will appear from the specification and claims herein.

Fig. 1 shows a side view of a tea pot or coffee pot equipped with a strainer embodying my invention, portions being broken away to show the strainer and adjacent portions of the receptacle and spout in vertical section.

Fig. 2 is a plan or face view of the head end of the strainer and Fig. 3 is a similar view looking at the neck end of the strainer.

Figs. 4 and 5 are respectively sectional and side views of the strainer.

Fig. 6 is a vertical sectional view of a strainer and adjacent parts of the receptacle when the strainer fits a hole in the receptacle smaller than the adjacent cavity of the spout.

Referring to the drawings in a more particular description it will be seen that the receptacle 7 is of a common type having a cover 8, suitable handle 9 and a spout 10.

As illustrated in the drawings and as used in the preferred form of my construction, the opening 11 from the receptacle 7 to the adjacent end 12, that is the lower and attached end of the spout, is as large as the cross area or opening 13 of said lower end 12.

Into these adjacent openings 11 and 13 in the receptacle and adjacent end 12 in the spout there is removably inserted from the chamber 14 of the receptacle 7 the neck 15 of the strainer 16. The said strainer consists of the neck 15 and a perforate head 17. The neck 15 is preferably tubular in form and also preferably slightly tapering, that is smaller in diameter towards its free end or its end away from the head so as to allow of a close frictional fitting or connection by a wedging action of the neck of the strainer in the communicating openings 11 and 13.

Fig. 6 shows my strainer used with another form of spouted receptacle in that the opening 11 through the receptacle is of smaller diameter than the opening 13 in the adjacent end 12 of the spout. In this construction it will be obvious that the frictional engagement or wedging fit of the neck 15 of the strainer 16 will be with the material at the edge of the receptacle opening 11 and not against the walls of the end 12 of the spout. This type of construction of the receptacle is sometimes used for convenience in manufacturing and will co-operate satisfactorily with the strainer as herein described except that of course the strainer will be of relatively smaller size.

The head 17 of the strainer has any desired number of perforations 18. Where the strainer is intended for use with a tea pot or coffee pot these perforations are very numerous, but of small diameter so as to effectually hold back the coffee grounds or tea leaves. The head 17 is of larger diameter than the neck 15 and in fact the neck 15 will be of such length and size as to hold the head out slightly into the main chamber 14 of the receptacle in order to allow the user to more readily grasp the strainer when she wishes to remove the strainer. Preferably the head 17 will be made with a decided bulge or overhang at its sides 19 as indicated in the drawings, that is the face of the head will be of considerably larger diameter than the neck and will project out beyond the neck and then curve or turn back at the sides 19 to meet the adjacent end of the neck 15. This bulging or overhanging construction of the sides 19 of the head performs several functions. First, the bulging or overhanging sides of the head being spaced appreciably from the adjacent inner surface of the receptacle 7 affords a ready hold by the user's fingers upon the head to remove the strainer from operative position. Secondly, these bulging sides render the strainer less liable to be stopped or covered up by tea leaves or the like in that said bulging sides provide surfaces facing in several different directions. It will be understood that these bulging sides are perforated upon the extreme periphery of the head as at 20 and also upon the rearward side 21 of the bulging sides, that is the portion of the head where it is decreasing in diameter to meet and connect with the adjacent end of the neck 15. These perforated bulging sides it will be seen not only provide additional perforated area but also provide surfaces facing in different directions or as it were substantially for nearly 180 degrees of a circle.

Preferably the overhanging sides 19 of the head will be formed so as to be in cross section gently curving in order to avoid injuring the hand when firmly grasped whether the strainer be made of metal, glass, china or earthen ware, and further to assure that the resulting inside recess 22 within the bulging side be open enough to allow that portion of the strainer to be readily and thoroughly cleaned when the strainer is being washed.

It will be seen that a strainer of this construction may be readily pressed or stamped out of any of the metals commonly used for tea pots, coffee pots or like spouted receptacles or may be molded, cast or otherwise formed from glass, china, earthen ware or even metal.

A strainer embodying the construction now described it will be obvious may be readily inserted into the opening by hand without any special manipulation of the parts and may be as readily removed. The frictional engagement or wedging action of the strainer adapts it to continue to securely fit any given receptacle by simply pushing the strainer farther into the aperture provided therefor. It will be seen that the strainer is simple in construction, convenient in use and well adapted to perform the functions and purposes and have the advantages heretofore set forth in this specification.

It will be obvious that a strainer embodying my invention is not limited to the circular shape shown in Figs. 2 and 3 but may be oval or otherwise curved or even angular to fit its co-operating opening. It will also be understood that the strainer may be formed on a curve or with an angle to fit a horizontal or even a vertical curve or angle in the receptacle.

What I claim as new and desire to secure by Letters Patent is:

1. In combination, a coffee pot or like receptacle, a spout leading therefrom and a strainer removably fitting into the opening from the receptacle into the spout, said strainer having a continuous tubular, tapering neck frictionally fitting into the spout opening and adapted to be readily removed therefrom and a perforate head of greater diameter than the opening into the spout.

2. In combination, a receptacle, a spout leading therefrom and an integrally formed strainer removably fitting into the opening from the receptacle into the spout, said strainer having a continuous tubular neck frictionally fitting into the spout opening and adapted to be readily removed therefrom and a head with sides bulging beyond the neck, said head being perforated on its face, edges and on the side of said bulge towards the neck.

In witness whereof I have affixed my signature, this 15th day of September 1924.

MARY E. WEDGE.